June 15, 1943.   R. TEMPLE   2,321,875
LOAD TESTING APPARATUS
Filed Oct. 23, 1940

INVENTOR.
ROBERT TEMPLE
BY Frank E. Foote
ATTORNEY.

Patented June 15, 1943

2,321,875

UNITED STATES PATENT OFFICE 2,321,875

LOAD TESTING APPARATUS

Robert Temple, Swissvale, Pa., assignor, by mesne assignments, to Temple Velocity Equipment, Inc., a corporation of Delaware Application October 23, 1940, Serial No. 362,303

5 Claims. (Cl. 265—14)

This invention relates to a load or stress testing apparatus and more particularly to a portable, self-contained apparatus adaptable to test cables and attached fittings in assembled condition.

Tensile testing machines heretofore available employed the principle of applying a load to a joint or to a material to test the strength of the specimen, but because of the nature of the machines and the principle followed in applying a load, they have no application to testing joints or structures unless the specimen can be brought to the machine.

In industry, application has been made of portable tools for forming joints in connecting cables and fittings, as by the use of my method and apparatus described and claimed in U. S. Patent No. 2,064,129. This explosively operated tool has increased in use greatly partly because of aircraft uses, but mainly because of the many uses to which this type of tool is adaptable, and along with these uses has come the need for some means of testing the joints and connections formed, but apparatus available has been of a very cumbersome and inefficient type, such as by applying a turnbuckle to the joint and by sheer physical force exert a tensile stress. The disadvantages in its use are apparent, but in spite of the need that has existed, this has been the only means available prior to the apparatus of this invention.

It is among the objects of this invention to provide a load testing apparatus which is self-contained, portable, simple in operation, inexpensive to manufacture, indicative of the stress applied, sufficiently accurate, operative to apply stresses required in testing the strength of cables or cables and attached fittings used or repairs made to completed assemblies or connections made or joints formed in installing additional appliances, and adaptable to the many other applications where it is desired to apply a load test within the limits of portable apparatus.

An embodiment of an apparatus adaptable for these purposes is hereinafter described and is illustrated in the drawing in which.

Figure 1:
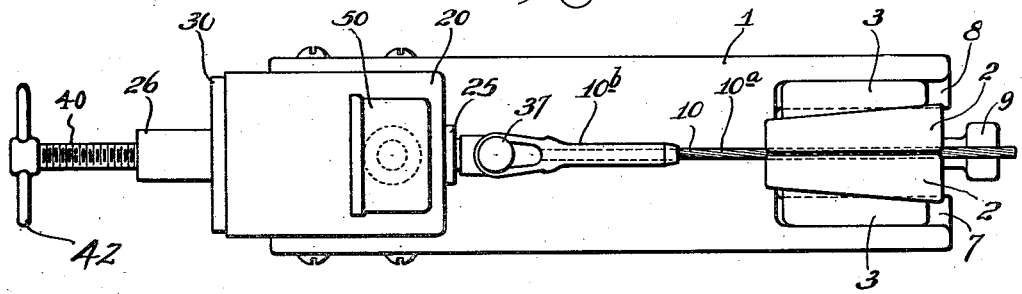
Fig. 1 is a plan view of the preferred embodiment and it illustrates a manner of testing a cable and its attachment to a fitting.
Figure 2:
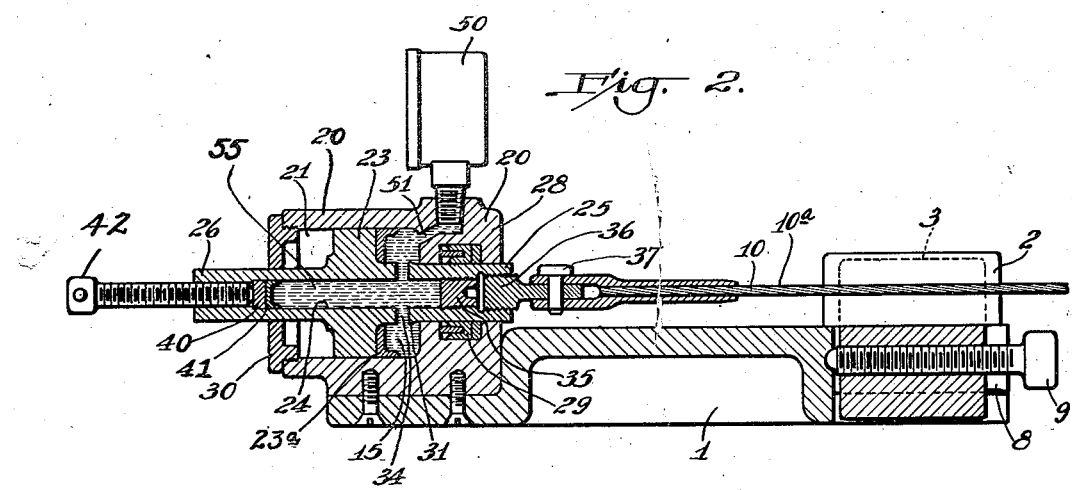
Fig. 2 is a side view in section of the apparatus illustrated in Fig. 1.
Figure 3:
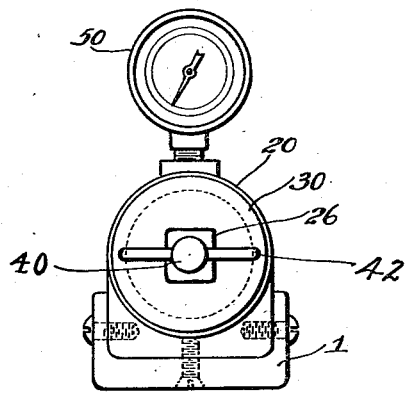
Fig. 3 is an end view in elevation of the same apparatus.
Figure 4:
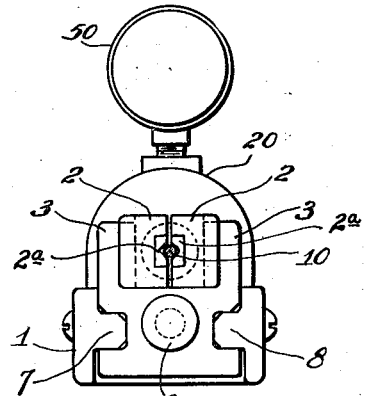
Fig. 4 is a view in elevation of the opposite end thereof.

Referring to the drawing, the apparatus illustrated is adaptable for the testing of cables up to and including ¼" in diameter, and it is this type of cable which is quite generally used and which will be found in structures such as in aircraft construction. In view of the rapid improvement in this type of conveyance as well as the large and extensive amount of maintenance encountered in maintaining the apparatus in workable condition, it is necessary frequently to install or renew a cable or replace or add an attached fitting such as are connected to cables when they are assembled into the construction or to add improvements to the original construction.

In view of the important function of cables themselves and because of the necessity of providing a secure joint, it is most desirable to have some means available for testing the strength of a joint and to know whether the joint will support adequately the amount of stress to which the cable may be subjected.

The important feature of my apparatus is its portability and the embodiment illustrated is mounted on a frame or base 1, measuring less than 18" in overall length and can be made of suitable cast or forged material. The frame carries at one end a pair of cable gripper blocks 2 which are supported directly by means of a pair of wedge blocks 3 which are directly supported on T-shaped sides 7 and 8 of the frame which form slides upon which the wedge blocks can move and which are moved by means of an adjusting screw 9 abutting the frame and threaded to the wedge blocks. Soft center inserts 2a are provided to actually engage the cable and these may be made of any suitable metal such as lead which securely engage a cable surface without damage and which are readily attached to a hard metal body. The blocks when moved longitudinally along the frame cause an inward movement of the gripper blocks and their engagement with a cable specimen 10 which in the drawing is illustrated as a cable 10a having attached a bifurcated coupling 10b. Further movement of the blocks after they have securely engaged the cable will cause the whole assembly to be moved outwardly and this function is useful in applying an initial tension on the cable. The advantage of this will become more apparent after the description of my fluid load applying means which is supported by the frame.

At the opposite end of the frame or base and in spaced relation to the gripper blocks is supported or mounted a cylinder 20 having an inner wall 21 defining an inner chamber and to which a piston 23 is fitted. A tubular portion 25 and 26 extend on each side of the piston proper and are made integral with the piston to form a piston assembly. A passage 24 internally of the piston assembly is continuous from the outer end of the tubular portion 25 through the piston to the outer end of the tubular portion 26. The inward extending portion 25 is mounted on to the inward end 28 of the cylinder 20 so that it can slidably move relative to the cylinder and a suitable fluid packing 29 supported by the cylinder end is positioned to engage the outer surface of the portion 25 and to seal off the chamber of the cylinder between the piston 23 and the cylinder. The other extending portion 26 passes through a cap 30 that is attached to and forms the outward end of the cylinder and has a square opening through which the outward extending portion 26 of the piston having a similar outer square surface passes and provides a guide and a support for the piston assembly against turning during movement of a plunger 40 into the passage 24.

In order to limit the inward movement of the piston, an annular shoulder or stop 31 is formed in the outer surface of the inward portion of the piston and this abuts an inner surface of the end 28 of the cylinder to stop further inward movement which defines the normal starting position of the apparatus. A fluid chamber 15 is formed between the piston and the walls of the cylinder when the piston is at this most inward or normal position. A series of lateral openings 34 in the inward extending portion 25 connect the passage 24 of the piston to the fluid chamber. In order to seal the chamber tightly, a piston cup washer 23a is placed inward of the piston and against the pressure active side and is operative to fluidly seal the chamber while permitting movement of the piston in either direction. A plug 35 closes off the inner extent of the passage 24 of the piston and an adaptor 36 is also attached to this end by means of threaded engagement and is placed outward of the plug 35 to serve as the other specimen engaging end cooperative with the gripper blocks 2 to place stress on the specimen 10. This adaptor in this instance is made to engage the bifurcated end of the coupling and is attached thereto by means of a pin 37 that passes through openings in each of the engaging members.

At the opposite end of the passage in the vicinity of the outer extending tubular portion 26 is located the plunger 40 that is threaded to the inner surface and it has a cup washer 41 that is placed ahead of the plunger to form a fluid tight plunger. Movement of the plunger is facilitated by means of a handle 42.

In the development of this invention it has been found that within the fluid chamber 15 and the connected passage 24 of the piston, it is desirable to use some form of a fluid medium 55 such as an ordinary lubricating grease. The kind of fluid medium used can be readily determined from the conditions to be encountered and the extent of seal provided. It is apparent that a medium of greater viscosity requires a less forceful seal than should a medium of lesser viscosity be used. For the purpose of determining the extent of pressure applied to the fluid medium in the chamber 15, a gage 50 is attached to the cylinder and connected to the fluid medium by means of an opening 51.

By moving the plunger 40 relative to the piston, as, for instance, by moving the plunger inwardly, this in turn places a pressure on the fluid medium in the passage and in the chamber which causes a pressure to be exerted outwardly on the piston. This pressure moves the piston or at least causes a stress to be applied to it which is transferred to the specimen. In this manner, the desired stress can be placed on the joint or connection and the extent readily determined from the gage. It has been found that the stresses required in testing the security of connection can be readily produced by this apparatus by means of normal movement of the plunger relative to the piston and without requiring much effort.

To decrease the amount of movement of the piston required to apply the desired stress and thus hold the cylinder size to a minimum in length, the initial stress can be applied by movement of the blocks 2 so that when the piston is at its most inward position some stress exists on the specimen and a very small movement of the piston outwardly will produce the desired stress.

The apparatus can be readily placed in operation and is capable although portable to apply the necessary stress to the specimen even though the specimen is in an assembled condition relative to the construction of which it forms a part and by applying this test it insures against failure during use of the structure.

This embodiment illustrates the principle involved in this invention and also provides an apparatus which possesses characteristics desired. It is recognized that modifications can be made of this embodiment as well as providing other embodiments of the invention, and it is intended that the invention be restricted only by the scope of the appended claims.

I claim:

1. A portable self-contained load testing machine comprising a frame, a gripper means mounted onto the frame and adapted to be attached to and retain a specimen, a tension applying means attachable to the specimen and supported by the frame and spaced from the gripper means comprising a cylindrical member attached to the frame, a relatively movable member having a portion slidably fitted and fluidly sealed to the inner wall of the cylindrical member, a stop means defining a fluid chamber between one side of the member and the cylindrical member, the member having a portion extending through the end of the cylindrical member and having an engageable means to which the other end of the specimen is to be attached, the member extending through the rearward end of the cylindrical member and having an inner fluid chamber open at the rearward end of the member and having an opening connected to the fluid chamber, a fluid medium in the fluid chamber and the inner chamber of the movable member, a plunger fitted to the inner wall of the chamber of the movable member and operative to be movable into the inner chamber to exert pressure on the fluid medium in the inner chamber of the member and the connected fluid chamber of the cylindrical member to apply pressure to the movable member in a direction away from the specimen to produce stress in the specimen and a means to indicate the amount of stress applied.

2. A portable self-contained load testing machine comprising a frame, a gripper means mounted onto the frame and adapted to be attached to one end of a specimen, a stress applying means supported by the frame and spaced from the gripper means comprising a cylinder attached to the frame, a piston member within the cylinder, a stop means defining a fluid tight chamber between the forward side of the piston and the cylinder, the piston having a means extending through the forward end of the cylinder and having an engageable means to which the specimen is to be attached, the piston having a hollow portion open at the rearward end of the piston and connected to the fluid chamber, fluid medium in the fluid chamber and the inner connected chamber of the piston, a plunger in said hollow portion and operative to exert pressure on the fluid medium to apply pressure to the piston to cause movement of the piston away from the specimen to apply stress thereto and a means to indicate the amount of stress applied.

3. A portable self-contained load testing machine comprising a frame, a gripper means mounted onto the frame and adapted to be attached to one end of a specimen to be tested, a tension applying means spaced from the gripper means and fixed to the frame comprising a cylinder mounted onto the frame and having an inner fluid chamber, a piston member within the chamber, a stop means for the piston defining a fluid chamber between the forward side of the piston and the cylinder when the piston is at its forward extremity, the piston having a rod means extending through the forward and rearward ends of the cylinder, the forward portion of the rod means being sealed to the cylinder and having an engageable end, a specimen engageable means attached to the engageable end of the forward portion of the rod means, the piston having an inner chamber, the rearward portion of the rod means having a passage fluidly connected to the fluid chamber, fluid medium in the fluid chamber and connected inner chamber of the piston, a plunger in the passage of the rearward rod portion and operative to exert pressure on the fluid medium to apply pressure to the forward side of the piston and in a direction from the specimen and a means to indicate the amount of pressure applied.

4. A portable self-contained load testing machine comprising a frame, a gripper means mounted onto the frame and at one end thereof, a cylinder mounted onto the frame at the other end thereof and in spaced relation to the gripper means, a piston member within the chamber and having a portion fluidly sealed and slidably fitted to the wall of the cylinder, said piston having a hollow central portion and hollow integral tubular portions extending each side of the piston and with the inner passage of the portions and the hollow central portion of the piston being fluidly connected, the inwardly extending tubular portion being supported by the inward end of the cylinder to permit free relative movement, means to fluidly seal the inward portion to the cylinder, a stop means attached to the outer surface of the inward portion to restrict the inward movement of the piston to define a fluid chamber between the inward side of the piston and the cylinder, the inward tubular portion having a lateral passage positioned outwardly of the stop means to connect the passage within that integral tubular portion with the chamber, an engageable means attached to the end of the inwardly extending portion and to which a work specimen can be attached and operative to seal off the end of the passage in that portion, a fluid medium in the passage and fluid chamber, a plunger means within the passage of the outwardly extending tubular portion and operative by movement relative to that portion to exert pressure on the fluid and move the piston in an outward direction and a means to indicate the amount of pressure applied to the fluid medium.

5. A portable self-contained load testing machine comprising a frame, a gripper means mounted onto the frame and at one end thereof, means to move the gripper means longitudinally of the frame and operative to apply initial stress, a cylinder mounted onto the frame at the other end thereof and in spaced relation to the gripper means, a piston member within the chamber and having a portion fluidly sealed and slidably fitted to the wall of the cylinder, said piston having a hollow central portion and integral tubular portions extending each side of the piston and with the inner passage of the portions and the piston being in fluid connection, the inwardly extending tubular portion being supported by the inward end of the cylinder, means to fluidly seal the inward portion to the cylinder, a stop means attached to the outer surface of the inward portion to restrict the inward movement of the piston to define a fluid chamber between the inward side of the piston and the cylinder, the inward tubular portion having a lateral passage positioned between the central portion of the piston and the stop means to connect the passage of the inward tubular portion with the fluid chamber, an engageable means attached to the end of the inwardly extending portion and to which a work specimen can be attached and operative to seal off the end of the passage of that portion, a highly viscous medium in the connected passages and fluid chamber, a plunger means within the passage of the outward tubular portion and operative to exert pressure on the fluid and move the piston in an outward direction and a means to indicate the amount of pressure applied to the fluid medium.

ROBERT TEMPLE.